(12) United States Patent
Sekiguchi

(10) Patent No.: US 7,352,508 B2
(45) Date of Patent: Apr. 1, 2008

(54) FRESNEL LENS SHEET AND TRANSMISSION TYPE SCREEN COMPRISING IT

(75) Inventor: Hiroshi Sekiguchi, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 207 days.

(21) Appl. No.: 10/496,656

(22) PCT Filed: Nov. 21, 2003

(86) PCT No.: PCT/JP03/14927

§ 371 (c)(1),
(2), (4) Date: May 25, 2004

(87) PCT Pub. No.: WO2004/049020

PCT Pub. Date: Jun. 10, 2004

(65) Prior Publication Data

US 2005/0111099 A1 May 26, 2005

(30) Foreign Application Priority Data

Nov. 22, 2002 (JP) .............................. 2002-339247

(51) Int. Cl.
*G03B 21/60* (2006.01)
*G03B 21/56* (2006.01)
(52) U.S. Cl. ..................... 359/457; 359/453; 359/460
(58) Field of Classification Search ................ 359/453, 359/457, 460
See application file for complete search history.

(56) References Cited

U.S. PATENT DOCUMENTS 5,724,182 A 3/1998 Mitani et al.
6,292,295 B1 9/2001 Yamashita et al.
2004/0196562 A1* 10/2004 Watanabe et al. ............ 359/626
2005/0030620 A1* 2/2005 Goto et al. .................. 359/460

FOREIGN PATENT DOCUMENTS

| CN | 1150658 A | 12/1995 |
|---|---|---|
| JP | 59-119340 | 7/1984 |
| JP | 61-208041 | 9/1986 |
| JP | 61-256337 | 11/1986 |
| JP | 62-10637 | 1/1987 |
| JP | 63-110434 | 5/1988 |
| JP | 3-211540 | 9/1991 |
| JP | 2002-82212 | 3/2002 |

* cited by examiner

Primary Examiner—Diane I. Lee
Assistant Examiner—Magda Cruz
(74) Attorney, Agent, or Firm—Oliff & Berridge, PLC

(57) ABSTRACT

The present invention provides a Fresnel lens sheet capable of effectively preventing such troubles as the production of double images that occurs due to stray light. A Fresnel lens sheet (1) comprises a base (1*a*) in sheet form, and a plurality of prisms (2) formed on the incident side of the base (1*a*). Each prism (2) has a plane of refraction (3) that refracts imaging light (LS) projected from a projector (5), and a plane of total reflection (4) that totally reflects, toward the viewer's side, at least a part of the light that has been refracted at this plane of refraction (3). At least some of a plurality of the prisms (2) are so made that the imaging light (LS) that has passed through these prisms (2) emerges in the direction inclined toward the projector (5) side at predetermined angles ($\gamma b$, $\gamma c$) with respect to the normal perpendicular to the sheet plane of the base (1*a*).

9 Claims, 11 Drawing Sheets

FRESNEL LENS SHEET AND TRANSMISSION TYPE SCREEN COMPRISING IT

TECHNICAL FIELD

The present invention relates to a Fresnel lens sheet for use in a rear projection type television, particularly to a Fresnel lens sheet useful for condensing imaging light obliquely projected from a projector (light source) placed at its rear to let the light emerge toward the viewer's side as nearly parallel rays, and to a rear projection screen comprising the Fresnel lens sheet.

BACKGROUND ART

Conventionally known as a large-size-screen television is a rear projection type television in which imaging light (projected light) is projected on a rear projection screen from a projector placed at the rear of the rear projection screen to display an image to viewers.

In such a rear projection type television, imaging light projected from the projector is spread and the spread light is projected on the rear projection screen, so that it is necessary to keep a certain distance between the projector and the rear projection screen. A problem with a television of this type, therefore, is that the space in the direction of depth is apt to become large.

In view of this problem, there has been proposed so far a rear projection type television in which, in order to make the space in the direction of depth smaller, a projector 5 is placed obliquely below a rear projection screen 10' at the rear of it, as shown in FIG. 13, whereby the projector 5 is allowed to project imaging light LS obliquely and upwardly on the rear projection screen 10'.

Conveniently used as the rear projection screen 10' in a rear projection type television as is shown in FIG. 13 is a rear projection screen comprising a total reflection Fresnel lens, capable of condensing imaging light projected obliquely from its rear (Japanese Laid-Open Patent Publication No. 208041/1986). The total reflection Fresnel lens herein denotes a lens having a plurality of prisms, where imaging light is refracted at the first plane (plane of refraction) of each prism and is then totally reflected at the second plane (plane of total reflection) of each prism to emerge toward the viewer's side.

In a rear projection screen comprising such a total reflection Fresnel lens, the light path of imaging light is adjusted by totally reflecting the imaging light. Therefore, the rear projection screen can attain high transmittance even when imaging light is obliquely incident on the rear projection screen at a large angle.

However, the conventional rear projection screen described above is confronted with the following problem. Namely, in an area of a Fresnel lens sheet 1' constituting the conventional rear projection screen, on which area imaging light LS is incident at a small angle (an area close to a projector 5), a part of the imaging light LS refracted at the plane of refraction 3' of each prism 2' passes through the prism 2' without being totally reflected at the plane of total reflection 4' of the prism 2' and becomes stray light LY, as shown in FIG. 14. The stray light LY thus produced is, as shown in FIG. 15, reflected at the plane of emergence 1b' of the Fresnel lens sheet 1' and returns to the incident side via a base 1a'; this light repeatedly causes incidence and emergence while passing through a plurality of the prisms 2', and finally emerges from the plane of emergence 1b'. As shown in FIG. 15, the stray light LY emerging from the plane of emergence 1b' in this manner comes out from a point that is different from the point from which the imaging light LS is totally reflected from the plane of total reflection 4' of the prism 2', after being refracted at the plane of refraction 3' of the prism 2', comes out as normal light LZ. The stray light LY, therefore, causes such troubles as the production of double images to decrease image visibility.

SUMMARY OF THE INVENTION

The present invention has been accomplished in the light of the above-described problem. An object of the present invention is therefore to provide a Fresnel lens sheet useful for condensing imaging light obliquely projected from a projector (light source) placed at its rear to let the light emerge toward the viewer's side as nearly parallel rays, capable of reducing the production of stray light that occurs in an area on which imaging light is incident at a small angle, thereby effectively preventing such troubles as the production of double images; and a rear projection screen comprising the Fresnel lens sheet.

A Fresnel lens sheet according to the present invention, useful for condensing imaging light obliquely projected from a projector placed at its rear to let the light emerge toward a viewer's side as nearly parallel rays, comprises a base in sheet form; and a plurality of prisms formed on an incident side of the base, each of the prisms having a plane of refraction that refracts the imaging light projected and a plane of total reflection that totally reflects, toward the viewer's side, at least a part of the light refracted at this plane of refraction, and is characterized in that at least some of the plurality of prisms are so made that the imaging light that has passed through these prisms emerges in a direction inclined toward a projector side at a predetermined angle with respect to a normal perpendicular to a sheet plane of the base.

In the Fresnel lens sheet according to the present invention, it is preferable that the at least some of the plurality of prisms be those prisms that are situated in an area on which the imaging light projected from the projector is incident at a small angle to become stray light. Specifically, it is preferable that the imaging light that has passed through the prisms situated in an area on which the imaging light is incident at an angle of 45° or less be inclined toward the projector side, and it is more preferable that the imaging light that has passed through the prisms situated in an area on which the imaging light is incident at an angle of 40° or less be inclined toward the projector side. This is because stray light tends to be produced in an area on which imaging light is incident at angle of 45° or less, particularly 40° or less. However, not only the prisms situated in the above-described area, but also those prisms that are situated in any area covering the above-described area (e.g., the entire area of the sheet plane) may be made so that the imaging light that has passed through these prisms is inclined toward the projector side.

Further, in the Fresnel lens sheet according to the present invention, it is preferable that the plurality of prisms be so made that the angle at which the imaging light that has passed through the prisms is inclined increases gradually as an angle at which the imaging light is incident on the prisms decreases.

Furthermore, it is preferable that the Fresnel lens sheet according to the present invention further comprises, at least on a specific part of an emergent-side surface of the base, from which part the imaging light emerges in the direction inclined toward the projector side, a low-refraction layer made from a material whose refractive index is lower than that of a material for forming the base.

Furthermore, it is preferable that the Fresnel lens sheet according to the present invention further comprises a light-diffusing element provided at least on a specific part of an emergent-side surface of the base, from which part the imaging light emerges in the direction inclined toward the projector side. In this case, the light-diffusing element is preferably a rough surface or lenticular lens provided on the emergent side of the base.

Furthermore, it is preferable that the Fresnel lens sheet according to the present invention further comprises, on an emergent side of the base, a plurality of additional prisms by which, of the imaging light that has passed through the prisms, the imaging light inclined toward the projector side relative to the normal perpendicular to the sheet plane of the base is adjusted to emerge nearly vertically to the sheet plane of the base.

A rear projection screen according to the present invention comprises the above-described Fresnel lens sheet; and a light-diffusing sheet placed on the viewer's side of the Fresnel lens sheet.

According to the present invention, at least some of a plurality of the prisms formed on the incident side of the base (e.g., those prisms that are situated in an area on which imaging light projected from a projector is incident at a small angle to become stray light) are so made that the imaging light that has passed through these prisms emerges in the direction inclined toward the projector side at a predetermined angle with respect to the normal perpendicular to the sheet plane of the base, so that the relative positions of the apices of these prisms are shifted toward the side opposite to the projector. For this reason, it is possible to reduce the production of stray light, and is thus possible to effectively prevent such troubles as the production of double images.

Further, according to the present invention, by making the prisms so that the angle at which the imaging light that has passed through the prisms is inclined increases gradually as the angle at which the imaging light is incident on the prisms decreases, it becomes possible to make the direction in which the imaging light that has passed through the prisms emerges not vary discontinuously and abruptly on the sheet plane. It is, therefore, possible to prevent viewers who are viewing the displayed image from feeling that the image is somewhat defective.

Furthermore, according to the present invention, if a low-refraction layer made from a material whose refractive index is lower than that of a material for forming the base is provided on a specific part of the emergent-side surface of the base, from which part the imaging light emerges in the direction inclined toward the projector side, the reflection of the imaging light emerging in the direction inclined toward the projector side that occurs at the emergent-side surface of the base is reduced. It is, therefore, possible to prevent lowering of contrast or the like that is caused by the reflected light.

Furthermore, according to the present invention, by providing a light-diffusing element on a specific part of the emergent-side surface of the base, from which part the imaging light emerges in the direction inclined toward the projector side, even if the imaging light emerging in the direction inclined toward the projector side is reflected at the emergent-side surface of the base, the imaging light is reflected with diffusion. It is, therefore, possible to prevent lowering of contrast or the like that is caused by the reflected light.

Furthermore, according to the present invention, if a plurality of additional prisms are provided on the emergent side of the base, whereby, of the imaging light that has passed through the prisms formed on the incident side of the base, the imaging light inclined toward the projector side relative to the normal perpendicular to the sheet plane of the base is adjusted to emerge nearly vertically to the sheet plane of the base, it is possible to display a bright image to viewers.

EMBODIMENTS OF THE INVENTION

Embodiments of the present invention will be described hereinafter with reference to the accompanying drawings.

First Embodiment

First of all, a Fresnel lens sheet according to the first embodiment of the present invention and a rear projection screen comprising it will be described with reference to FIGS. 1 to 4. The Fresnel lens sheet according to the first embodiment of the present invention is used as a rear projection screen or an optical member of a rear projection screen for use in a rear projection type television, and comprises a plurality of prisms (total reflection Fresnel lens) that condense imaging light obliquely projected from a projector (light source) placed at the rear of the Fresnel lens sheet to let the light emerge toward the viewer's side as nearly parallel rays. In the first embodiment of the present invention, in order to reduce the production of stray light, at least some of a plurality of the prisms are so made that the direction in which the imaging light that has passed through these prisms emerges partly changes on the sheet plane of the Fresnel lens sheet. The arrangement of the Fresnel lens sheet and a process of producing the Fresnel lens sheet are explained below in detail.

(Arrangement of Fresnel Lens Sheet)

Figure 1:
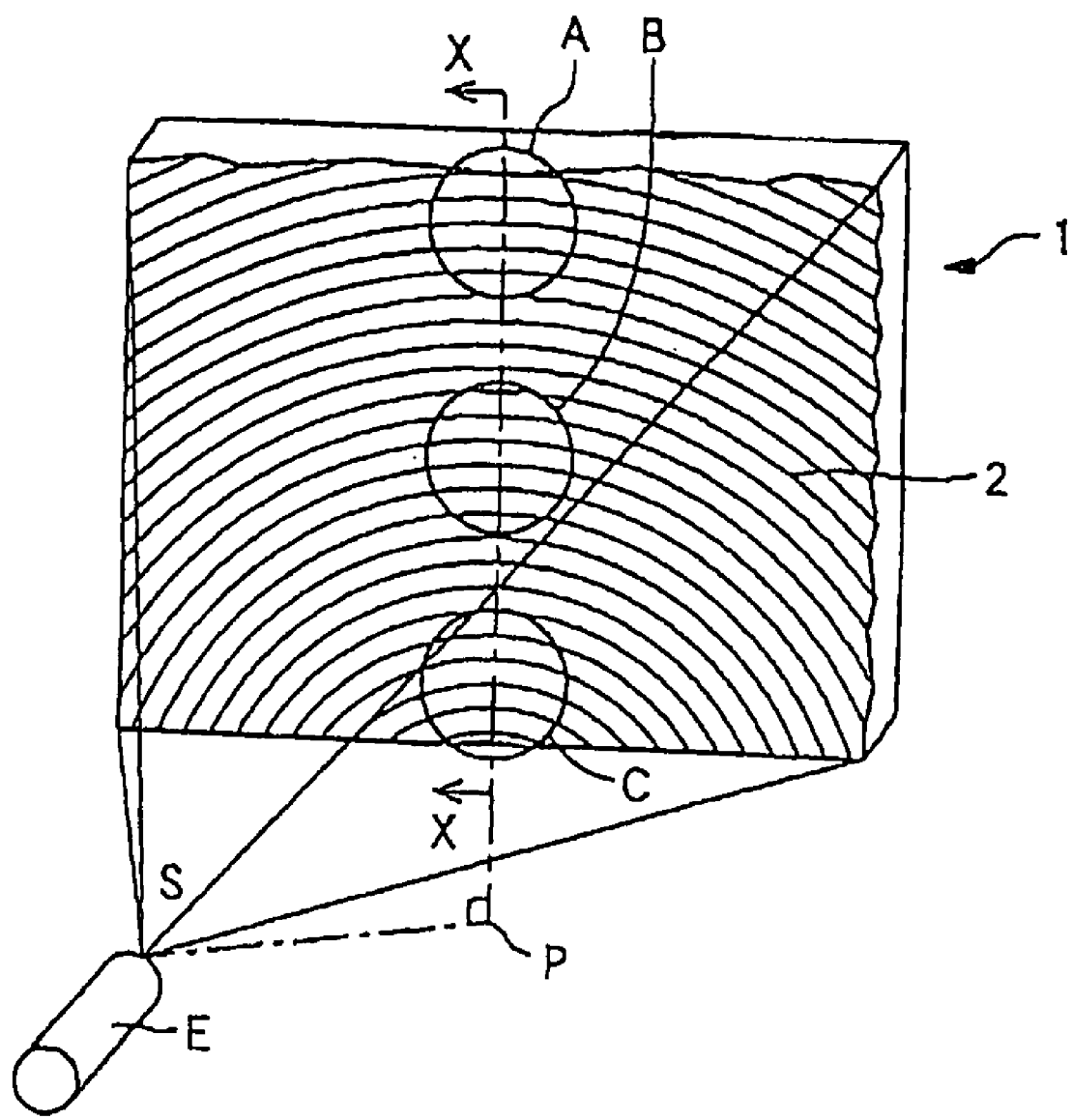
FIG. 1 is a perspective view showing a rear projection screen comprising a Fresnel lens sheet according to the first embodiment of the present invention, together with a projection system for the screen (a projection system that projects imaging light obliquely on the rear projection screen)

As shown in FIG. 1, the Fresnel lens sheet 1 according to the first embodiment of the invention is used as a rear projection screen 10 on which imaging light LS is projected obliquely from a projector 5, and has a plurality of prisms 2 in the shape of circular arcs formed on the incident-side surface of a base 1a in sheet form. A plurality of the prisms 2 are herein disposed concentrically around the point P positioned below the center of the lower edge of the Fresnel lens sheet 1.

Figure 2A:
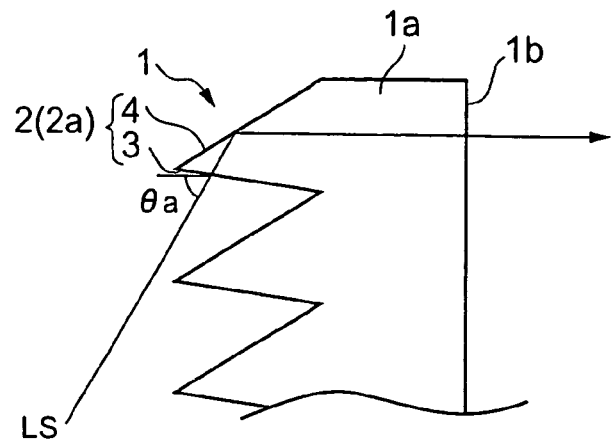
FIGS. 2A, 2B and 2C are sectional views of areas A, B and C of the Fresnel lens sheet shown in FIG. 1, respectively, taken along line X-X in FIG. 1.
Figure 2B:
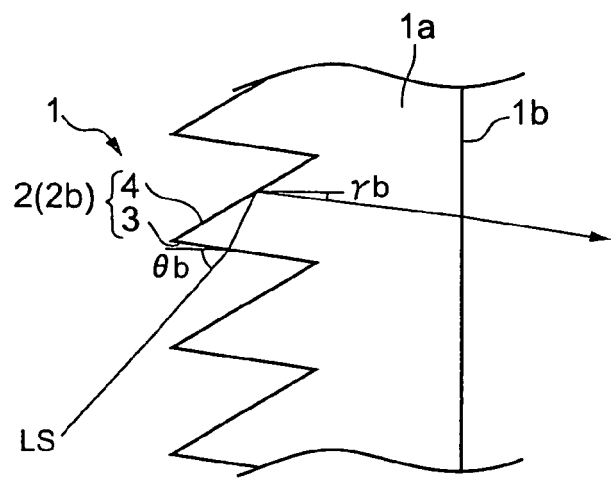
Figure 2C:
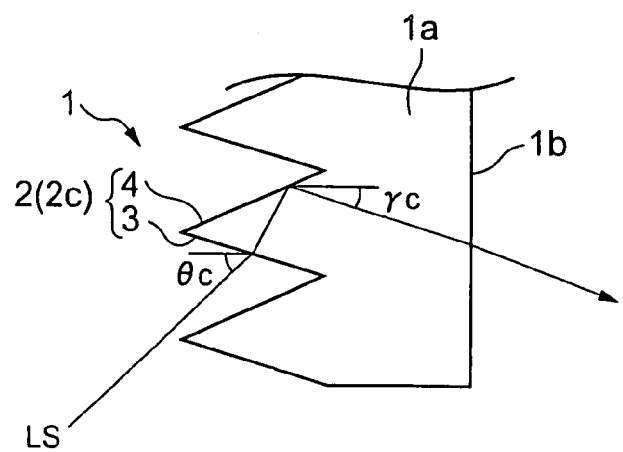

FIGS. 2A, 2B and 2C are sectional views of areas A, B and C of the Fresnel lens sheet 1 shown in FIG. 1, respectively, taken along line X-X in FIG. 1.

As shown in FIGS. 2A to 2C, each prism 2 is formed to have a triangular cross section, and has a plane of refraction 3 that refracts imaging light LS projected from the projector 5 placed at the rear of the Fresnel lens sheet 1 and a plane of total reflection 4 that totally reflects, toward the viewer's side, at least a part of the light that has been refracted at this plane of refraction 3.

Conventionally, a plurality of the prisms 2 are so made that the imaging light LS that has passed through the prisms 2 emerges in the direction of the normal perpendicular to the sheet plane of the base 1a. In the first embodiment of the present invention, however, at least some of the plurality of prisms 2 are so made that the imaging light LS that has passed through these prisms 2 emerges in the direction inclined toward the projector 5 side at a predetermined angle γ with respect to the normal perpendicular to the sheet plane of the base 1a. Specifically, of a plurality of the prisms 2, at least those prisms that are situated in an area on which imaging light LS projected from the projector 5 is incident at a small angle θ to become stray light (e.g., an area on which imaging light LS is incident at an angle of 45° or less, more preferably 40° or less) are so made that the imaging light LS that has passed through these prisms 2 is inclined toward the projector 5 side. However, not only the prisms 2 situated in the above-described area, but also those prisms 2 that are situated in any area covering the above-described area (e.g., the entire area of the sheet plane) may be so made that the imaging light LS that has passed through these prisms 2 is inclined toward the projector 5 side.

The prisms 2 are herein so made that the inclination, toward the projector 5 side, of the direction in which imaging light LS emerges from the prisms 2 gets greater as the angle of incidence θ at which the imaging light LS projected from the projector 5 is incident on the prisms 2 decreases.

Specifically, for example, those prisms 2a that are situated in the area A distant from the projector 5, on which area imaging light LS is incident at a large angle θ (angle of incidence θ=θa), are so made that the imaging light LS emerges from these prisms 2a in the direction nearly vertically to the sheet plane of the Fresnel lens sheet 1 (see FIG. 2A). On the contrary, those prisms 2b that are situated in the area B on which imaging light LS is incident at an angle θ smaller than the angle at which imaging light LS is incident on the area A (angle of incidence θ=θb<θa) are so made that the imaging light LS emerges from these prisms 2b in the direction inclined toward the projector 5 side at an angle γb with respect to the normal perpendicular to the sheet plane of the Fresnel lens sheet 1 (see FIG. 2B). Further, those prisms 2c that are situated in the area C on which imaging light LS is incident at an angle θ smaller than the angles at which imaging light LS is incident on the area A and on the area B (the angle of incidence θ=θc<θb<θa) are so made that the imaging light LS emerges from these prisms 2c in the direction inclined toward the projector 5 side at an angle γc (γc>γb) with respect to the normal perpendicular to the sheet plane of the Fresnel lens sheet 1 (see FIG. 2C). Those prisms 2 that are situated between the respective prisms 2 (2a, 2b, 2c) shown in FIGS. 2A to 2C are so made that the angle γ at which the imaging light LS that has passed through the prisms 2 is inclined increases gradually as the angle θ at which the imaging light LS is incident on the prisms 2 decreases.

In the above-described embodiment, the prisms 2 are so made that the direction in which the imaging light LS that has passed through the prisms 2 emerges varies gradually on the sheet plane. The prisms 2 may also be made so that the direction in which the imaging light LS that has passed through the prisms 2 emerges is inclined at a fixed angle γ on a predetermined part of the sheet plane, or that the direction in which the imaging light LS that has passed through the prisms 2 emerges is inclined at a fixed angle γ on the entire part of the sheet plane.

Thus, in the Fresnel lens sheet 1 shown in FIG. 1 and FIGS. 2A to 2C, the shape of each prism 2 is varied depending upon the angle θ at which imaging light LS is incident on the prism 2, and the prism 2 on which imaging light LS is incident at a smaller angle θ is so made that the imaging light that has passed through this prism 2 emerges in the direction inclined more greatly toward the projector 5 side. For this reason, the following characteristic features are imparted to the Fresnel lens sheet 1.

Figure 3A:
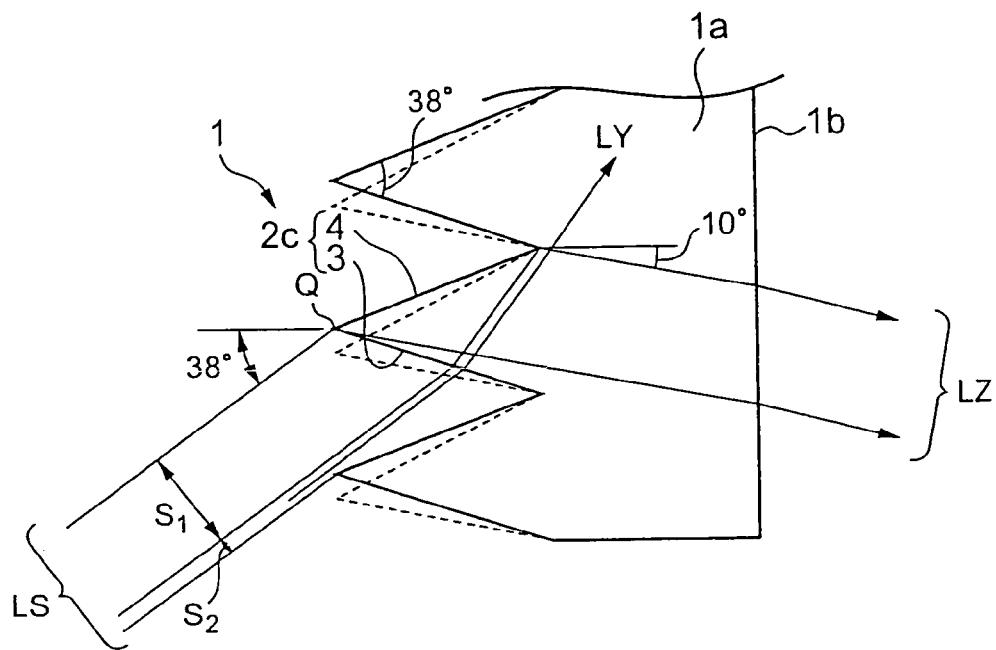
FIG. 3A is an illustration showing the behavior of imaging light in those prisms situated in an area of the Fresnel lens sheet shown in FIG. 1, on which area imaging light is incident at a small angle.
Figure 3B:
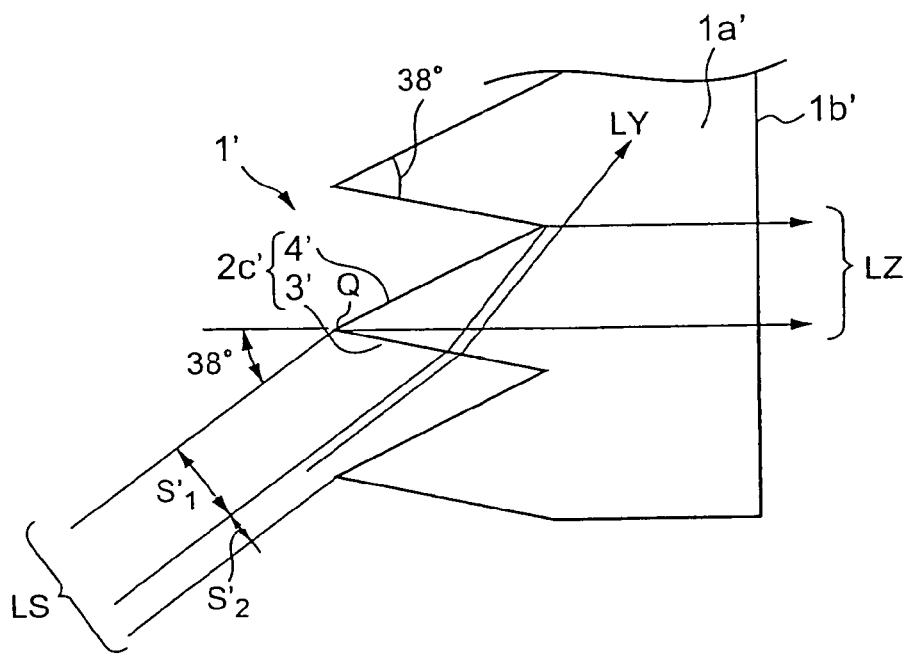
FIG. 3B is an illustration showing the behavior of imaging light in those prisms situated in an area of a conventional Fresnel lens sheet corresponding to the area shown in FIG. 3A.

The characteristic features of the Fresnel lens sheet 1 shown in FIG. 1 and FIGS. 2A to 2C will be described hereinafter with reference to FIGS. 3A and 3B. FIG. 3A is an illustration showing the behavior of imaging light LS in those prisms 2c situated in the area C of the Fresnel lens sheet shown in FIG. 1, on which area the imaging light LS is incident at a small angle θ, while FIG. 3B is an illustration showing the behavior of imaging light LS in those prisms 2c' situated in an area of a conventional Fresnel lens sheet 1' corresponding to the area C. The following are herein assumed for consideration: the imaging light LS emerges from the prisms 2c in the direction inclined toward the projector 5 side at an angle of 10° with the normal perpendicular to the sheet plane of the Fresnel lens sheet 1; the imaging light LS emerges from the prisms 2c' in the direction of the normal perpendicular to the sheet plane of the Fresnel lens sheet 1'; both the angle at which the imaging light LS is incident on the prisms 2c and the angle at which the imaging light LS is incident on the prisms 2c' are 38°; both the apical angle (the angle between the plane of refraction and the plane of total reflection) of each prism 2c and the apical angle of each prism 2c' are 38°; and both the refractive index of each prism 2c and that of each prism 2c' are 1.55.

As shown in FIG. 3B, of the imaging light LS incident on the prisms 2c' on the conventional Fresnel lens sheet 1', the light incident on the portion $S_1'$ is totally reflected at the plane of total reflection 4' and emerges as normal light LZ, while the light incident on the portion $S_2'$ passes through without being totally reflected at the plane of total reflection 4' and becomes stray light LY. At this time, the percentage of the imaging light LS that becomes stray light LY (the light incident on the portion $S_2'$) to all of the imaging light LS incident on each prism 2c' (the total of the light incident on the portion $S_1'$ and the light incident on the portion $S_2'$) becomes approximately 25%. This means that the stray light LY is produced at a high rate.

On the contrary, as shown in FIG. 3A, the prisms 2c on the Fresnel lens sheet 1 according to the first embodiment of the present invention are so made that the imaging light LS that has passed through these prisms 2c emerges in the direction inclined toward the projector 5 side. The relative positions of the apices Q of the prisms 2c are, therefore, shifted toward the side opposite to the projector 5 (the upper side of FIG. 3A) as compared with the apices of the prisms 2c' on the conventional Fresnel lens sheet 1' shown in FIG. 3B (indicated by the dotted lines in FIG. 3A). By so making the prisms 2c on the Fresnel lens sheet 1, the percentage of the imaging light LS that becomes stray light LY (the light incident on the portion $S_2'$) becomes approximately 13%, much lower than the above-described percentage, and such troubles as the production of double images is thus prevented.

As described above, the Fresnel lens sheet 1 according to the first embodiment of the present invention can significantly decrease the stray light LY production rate as compared with the conventional Fresnel lens sheet 1'.

To consider, in more detail, the features of the Fresnel lens sheet 1 according to the first embodiment of the present invention, the stray light LY production rates at the prisms on which imaging light LS is incident at angles of 35°, 38° and 40° are shown in Table 1. To obtain the stray light production rates, the following were assumed: the apical angle of each prism 2 is 38°; the refractive index of each prism 2 is 1.55; and the imaging light LS that has passed through the prisms 2 emerges in the direction inclined toward the projector 5 side (downward) at an angle of 3°, 6.5° or 10°. For comparison, the stray light LY production rates when the imaging light LS that has passed through the prisms 2 emerges in the direction of the normal perpendicular to the sheet plane of the Fresnel lens sheet 1 are also shown in Table 1.

TABLE 1

| Direction of Emergence | Angle of Incidence 35° | Angle of Incidence 38° | Angle of Incidence 40° |
|---|---|---|---|
| Perpendicular to lens plane (conventional Fresnel lens sheet) | 30% | 25% | 18% |
| Downward at 3° | 24% | 18% | 14% |
| Downward at 6.5° | 22% | 16% | 11% |
| Downward at 10° | 20% | 13% | 8% |

As shown in the above Table 1, as compared with the conventional Fresnel lens sheet 1', the Fresnel lens sheet 1 according to the first embodiment of the present invention shows lower stray light LY production rates for the imaging light LS incident on the prisms at any angle. In the case of the Fresnel lens sheet 1 according to the first embodiment of the present invention, the stray light LY production rate decreases as the inclination of the direction in which the imaging light LS that has passed through the prisms 2 emerges gets greater from 3° to 6.5° and to 10° relative to the normal perpendicular to the sheet plane.

However, if the direction in which the imaging light LS that has passed through the prisms 2 emerges is excessively inclined toward the projector 5 side, the image displayed to viewers becomes dark unless a means for restoring the inclination of the direction in which the imaging light LS emerges is provided, as in Fresnel lens sheets 41 and 46 according to the third embodiment of the present invention that will be described later. It is, therefore, preferable that the direction in which the imaging light LS emerges be inclined at an angle of not more than a certain degree (e.g., not more than 13°) with respect to the normal perpendicular to the sheet plane.

(Process of Producing Fresnel Lens Sheet)

Next, a process of producing the Fresnel lens sheet 1 according to the aforementioned first embodiment will be described. The explanation will be hereinafter given with reference to the case where an ultraviolet-curing resin method is employed to produce the Fresnel lens sheet 1.

In this case, a mold is firstly prepared by engraving, using a cutting tool or the like, a mold material such as aluminum, brass or copper with the shape corresponding to the incident-side surface of the Fresnel lens sheet 1.

Thereafter, an ultraviolet-curing resin is applied to this mold. A coating method such as roll, gravure, dispenser or die coating may be used for this purpose.

Subsequently, a substantially transparent substrate that transmits ultraviolet light is laid on the ultraviolet-curing resin applied to the mold and is pressed by a pressure roller or the like, thereby bringing the substrate into close contact with the ultraviolet-curing resin. From above the substrate laminated in this manner, ultraviolet light is applied to cure the ultraviolet-curing resin.

The ultraviolet-curing resin thus cured is then released from the mold and is cut into the desired size, thereby obtaining a Fresnel lens sheet 1.

In the case where prisms 2 with excessively small apical angles are formed on the Fresnel lens sheet 1, the cutting tool or the like is easily broken and cutting becomes difficult while the mold material is engraved by using the cutting tool or the like as mentioned above. In addition, in this case, it is difficult to release the molded product from the mold. For this reason, if the mass productivity of the Fresnel lens sheet 1 is taken into consideration, it is preferable to make the apical angles of the prisms 2 between 35° and 45°.

Further, if the tip angle of the cutting tool or the like is fixed at a certain degree, the efficiency in the production of the mold becomes great. Therefore, if the efficiency in the production of the Fresnel lens sheet 1 is taken into consideration, it is preferable that the apical angles of all of the prisms 2 be the same.

Although the above explanation has been given with reference to the case where the ultraviolet-curing resin method is used as a process of producing the Fresnel lens sheet 1, the Fresnel lens sheet 1 can be produced not only by this ultraviolet-curing resin method but also by (1) a method in which a light-transmitting resin material in the molten state is loaded in a mold in the shape corresponding to the Fresnel lens sheet 1 and is cured, and the molded product is then released from the mold (casting method); (2) a method in which a light-transmitting resin material that has been heated is loaded in the same mold as in the above method (1) and is molded by the application of pressure, and the molded product is then released from the mold (hot-pressing method); or the like. The light-transmitting resin material used in the above methods includes acrylic, styrene, polycarbonate, and epoxy resins.

(Rear Projection Screen Comprising Fresnel Lens Sheet)

Although the Fresnel lens sheet 1 shown in FIG. 1 constitutes a rear projection screen 10 by itself, the Fresnel lens sheet 1 may be combined with other optical members to produce the rear projection screen 10.

Figure 4:
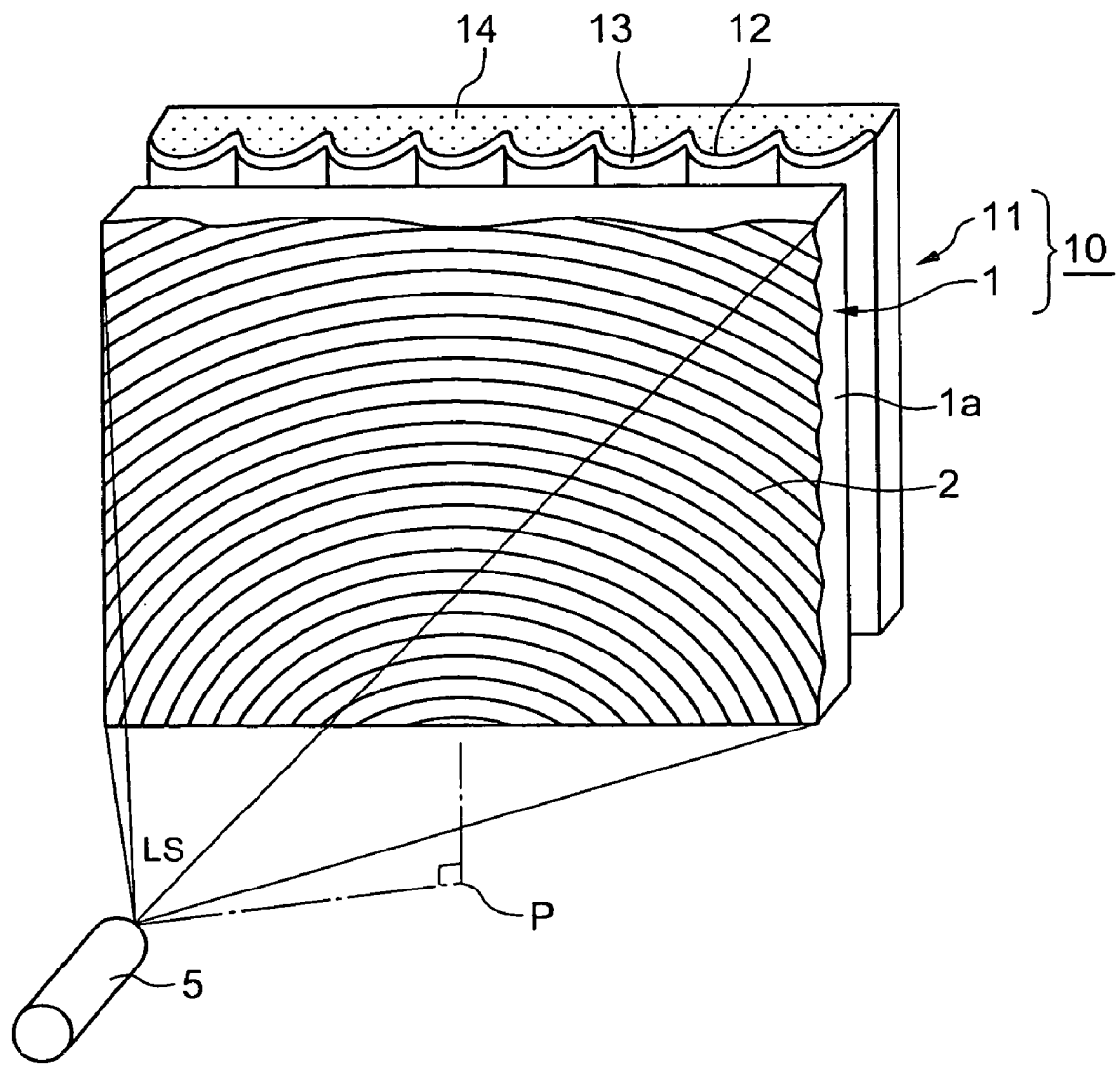
FIG. 4 is a perspective view showing a modification of the rear projection screen comprising the Fresnel lens sheet shown in FIG. 1.

FIG. 4 is a perspective view showing a modification of the rear projection screen 10 shown in FIG. 1. In the rear projection screen 10 shown in FIG. 4, a lenticular lens sheet (light-diffusing sheet) 11 is placed on the viewer's side of the Fresnel lens sheet 1, and is thus allowed to diffuse, in both the vertical direction (direction of up and down) and the horizontal direction (direction of right and left), the imaging light condensed by the Fresnel lens sheet 1. On the incident-side surface of the lenticular lens sheet 11, linear lenses with half-elliptic cross-sections 12 are formed in the vertical direction (direction of up and down in FIG. 4); light-absorbing layers 13 are formed on the surfaces of these lenses with half-elliptic cross-sections 12; and a diffusing agent 14 is dispersed in the lenses with half-elliptic cross-sections 12. Such a rear projection screen 10 as is shown in FIG. 4 may contain, instead of the lenticular lens sheet 11, a light-diffusing sheet having any other light-diffusing element, and the same effects can be obtained even in this case.

In the use of the rear projection screen 10 shown in FIG. 1 or 4, a projector 5 is placed obliquely below the screen 10 at its rear, whereby the projector 5 is allowed to project imaging light LS obliquely and upwardly on the rear projection screen 10 for displaying an image to viewers.

At this time, owing to the above-described construction of the prisms 2, the Fresnel lens sheet 1 constituting the rear projection screen 10 does not produce stray light, or even if it produces stray light, the amount of stray light produced is small, so that the image projected on the rear projection screen 10 is entirely uniform in brightness and that the image is never degraded by such troubles as the production of double images.

Second Embodiment

Next, a Fresnel lens sheet according to the second embodiment of the present invention and a rear projection screen comprising it will be described with reference to FIGS. 5 to 9. The Fresnel lens sheet according to the second embodiment of the present invention is equivalent to the Fresnel lens sheet according to the aforementioned first embodiment to which a low-refraction layer or light-diffusing element is further provided on its emergent-side surface (plane of emergence), and the other basic construction of the second embodiment is almost the same as that of the first embodiment described above. In the first and second embodiments of the present invention, like reference numerals are used to designate like parts, and detailed descriptions for these parts are omitted.

(Arrangement of Fresnel Lens Sheet)

Figure 5:
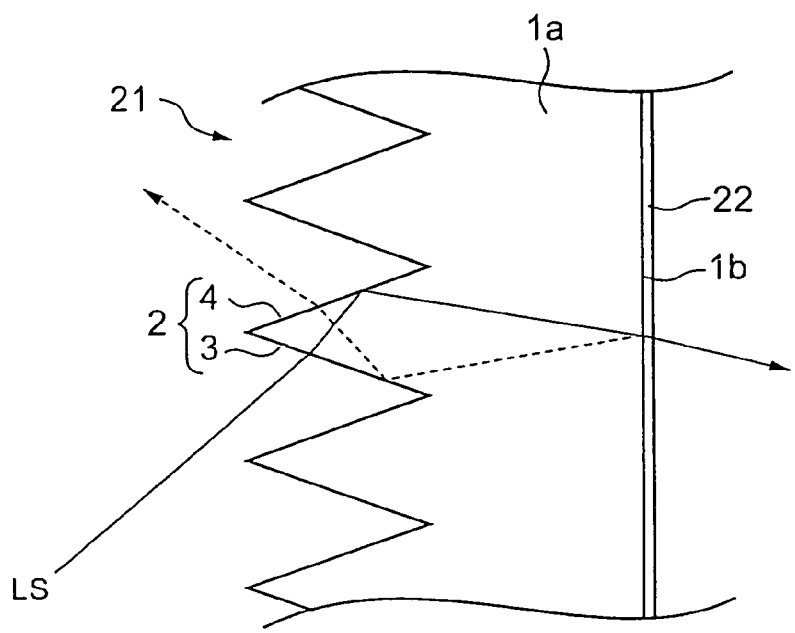
FIG. 5 is a sectional view, in the direction of thickness, showing a Fresnel lens sheet according to the second embodiment of the present invention.

As shown in FIG. 5, in the Fresnel lens sheet 21 according to the second embodiment of the invention, a coating layer (low-refraction layer) 22 is formed on the plane of emergence 1*b* of a base 1*a* whose incident-side surface is provided with prisms 2. The coating layer 22 is formed at least on a specific part of the plane of emergence 1*b* of the base 1*a*, from which part imaging light LS emerges in the direction inclined toward the projector 5 side.

The coating layer 22 is made from a material whose refractive index is lower than that of a material for forming the base 1*a*. Specifically, fluorocarbon resins, silicone resins, and the like may be used as materials for forming the coating layer 22.

Thus, in the Fresnel lens sheet 21 shown in FIG. 5, the coating layer 22 is formed on the plane of emergence 1*b* of the base 1*a* by the use of a material whose refractive index is lower than that of a material for forming the base 1*a*, so that the following characteristic features are impaired to the Fresnel lens sheet 21.

Figure 6:
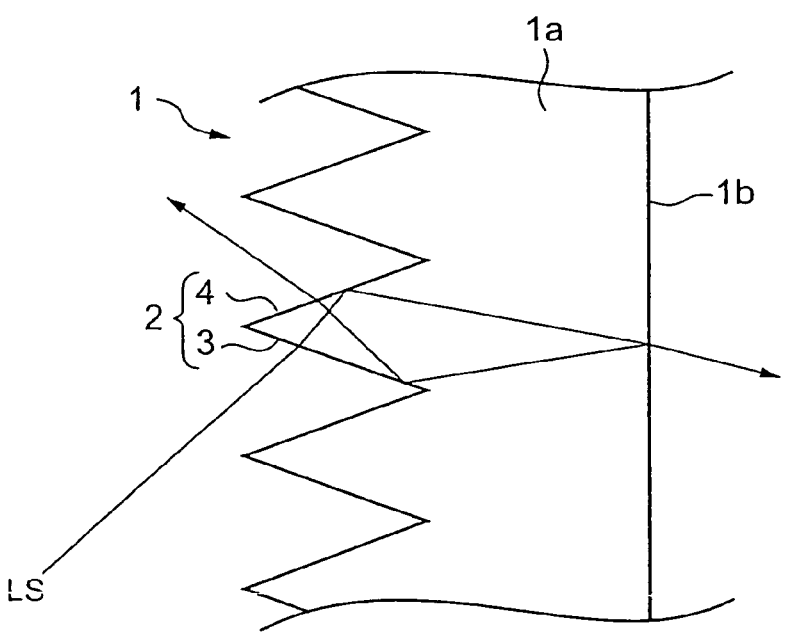
FIG. 6 is a view showing a conventional Fresnel lens sheet for comparison with the Fresnel lens sheet shown in FIG. 5.

The characteristic features of the Fresnel lens sheet 21 shown in FIG. 5 will be described hereinafter with reference to FIGS. 5 and 6. FIG. 6 is an illustration showing the behavior of imaging light LS in those prisms 2 that are situated in an area of the Fresnel lens sheet 1 having no coating layer on the plane of emergence 1*b* of the base 1*a*, on which area the imaging light LS is incident at a small angle θ (an area close to the projector 5).

Figure 9:
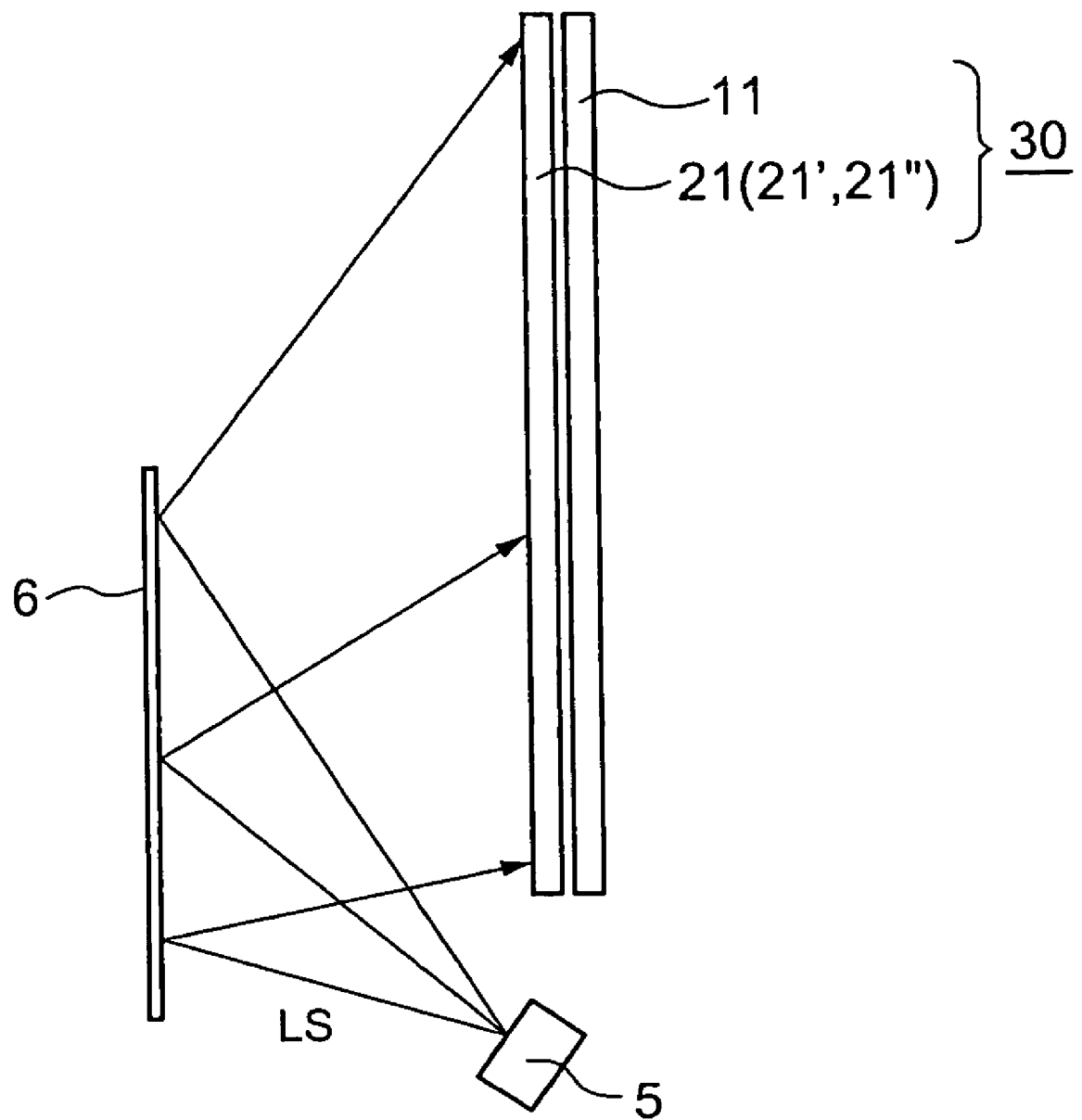
FIG. 9 is a view showing a rear projection screen comprising the Fresnel lens sheet shown in FIG. 5, 7 or 8, along with a projection system for the screen.

As shown in FIG. 6, in the Fresnel lens sheet 1 having no coating layer on the plane of emergence 1*b* of the base 1*a*, imaging light LS projected on-each prism 2 is refracted at the plane of refraction 3 of the prism 2 and is then totally reflected at the plane of total reflection 4 of the prism 2 in the direction inclined toward the projector 5 side relative to the normal perpendicular to the sheet plane; the totally reflected light travels toward the plane of emergence 1*b* of the base 1*a*. A part (e.g., approximately 4%) of the imaging light LS that has arrived at the plane of emergence 1*b* is reflected at the plane of emergence 1*b* and returns to the incident side. If such a Fresnel lens sheet 1 is used together with a projection system comprising a mirror 6 as is shown in FIG. 9, the imaging light LS reflected from the plane of emergence 1*b* of the base 1*a* of the Fresnel lens sheet 1 toward the incident side is reflected at the mirror 6 in the projection system; this reflected light passes again through the Fresnel lens sheet 1 and emerges from the plane of emergence 1*b*. The light emerging from the plane of emergence 1*b* of the Fresnel lens sheet 1 after following the above-described light path is not perceived as an image because the light path is considerably long. However, if this light and the imaging light emerging as normal light from the same spot overlap each other, image contrast is lowered.

On the contrary, as shown in FIG. 5, in the Fresnel lens sheet 21 having the coating layer 22 on the plane of emergence 1*b* of the base 1*a*, imaging light LS that has been refracted at the plane of refraction 3 of each prism 2 and then totally reflected at the plane of total reflection 4 of the prism 2 in the direction inclined toward the projector 5 side relative to the normal perpendicular to the sheet plane reaches the coating layer 22 formed on the plane of emergence 1b. Since the coating layer 22 is made from a material having a low refractive index, the imaging light LS that is reflected from the plane of emergence 1b toward the incident side is very few (e.g., approximately 2%). For this reason, the Fresnel lens sheet 21 shown in FIG. 5 can effectively prevent lowering of image contrast even when used, as shown in FIG. 9, along with a projection system comprising a mirror 6.

Figure 7:
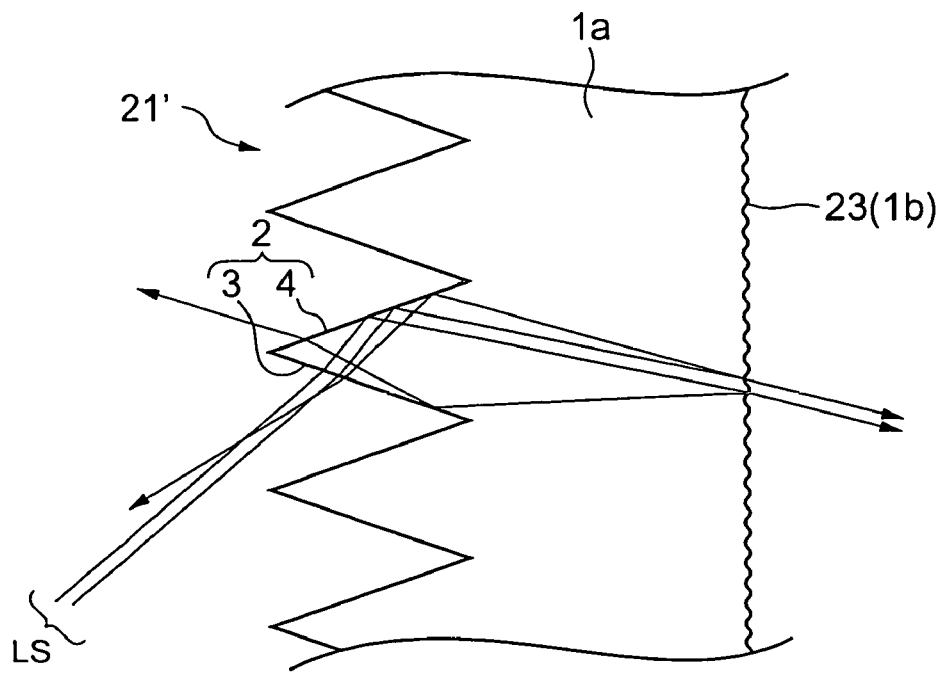
FIG. 7 is a sectional view, in the direction of thickness, showing a modification of the Fresnel lens sheet shown in FIG. 5.

To prevent lowering of image contrast, although the coating layer 22 is, in the Fresnel lens sheet 21 shown in FIG. 5, formed on the plane of emergence 1b of the base 1a, a rough surface (light-diffusing element) 23 may be provided, instead of the coating layer 22, on the plane of emergence 1b of the base 1a as in the Fresnel lens sheet 21' shown in FIG. 7. The rough surface 23 is provided at least on a specific part of the plane of emergence 1b of the base 1a, from which part the imaging light LS emerges in the direction inclined toward the projector 5 side.

As shown in FIG. 7, in the Fresnel lens sheet 21' having the rough surface 23 on the plane of emergence 1b of the base 1a, the imaging light LS that has been refracted at the plane of refraction 3 of each prism 2 and then totally reflected at the plane of total reflection 4 of the prism 2 in the direction inclined toward the projector 5 side relative to the normal perpendicular to the sheet plane is partly reflected at the rough surface 23 on the plane of emergence 1b and returns to the incident side, where the rough surface 23 scatters the light when it reflects the light. Therefore, when such a Fresnel lens sheet 21' is used together with a projection system containing a mirror 6 as is shown in FIG. 9, and even if the light reflected from the plane of emergence 1b of the base 1a of the Fresnel lens sheet 21' toward the incident side is reflected at the mirror 6 in the projection system and returns again to the Fresnel lens sheet 21', the intensity of this reflected light is fully decreased, and lowering of image contrast can thus be effectively prevented as in the case of the Fresnel lens sheet 21 shown in FIG. 5.

Although the rough surface 23 is, in the above embodiment, provided on the plane of emergence 1b of the base 1a of the Fresnel lens sheet 21', it may be provided not on the plane of emergence 1b but on a specific portion of the plane of refraction 3 of each prism 2 on the Fresnel lens sheet 21', on which portion the imaging light LS reflected from the plane of emergence 1b is incident. If the rough surface 23 is provided on such a portion, the imaging light LS that has returned to the incident side is partly scattered, so that lowering of image contrast can be effectively prevented as in the case of the Fresnel lens sheet 21' in which the rough surface 23 is provided on the plane of emergence 1b of the base 1a.

Figure 8:
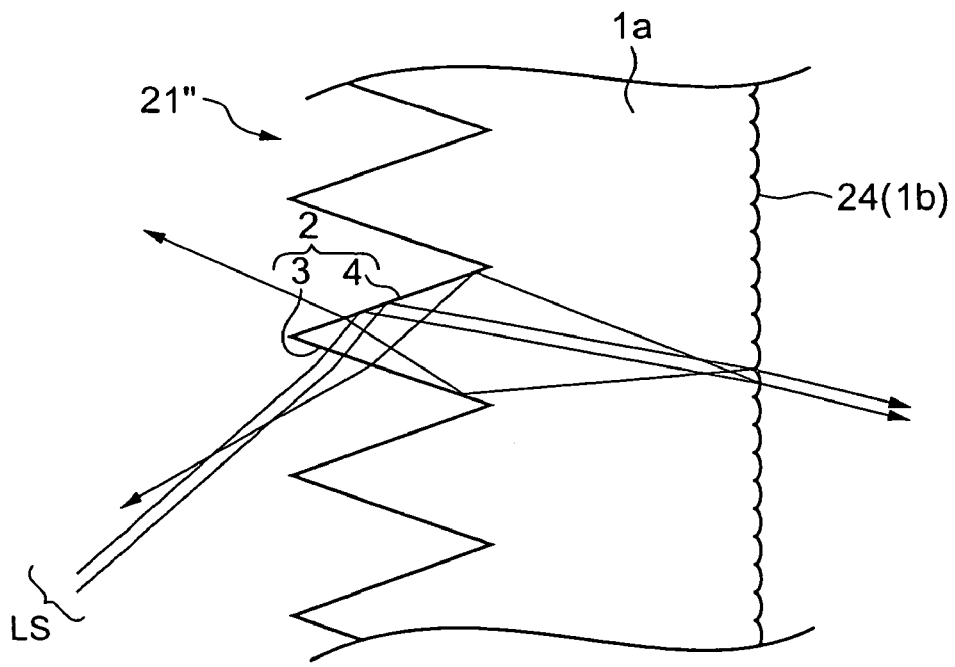
FIG. 8 is a sectional view, in the direction of thickness, showing another modification of the Fresnel lens sheet shown in FIG. 5.

On the other hand, instead of the rough surface 23 that is provided on the plane of emergence 1b of the base 1a of the Fresnel lens sheet 21', a lenticular lens (light-diffusing element) 24 may be provided on the plane of emergence 1b of the base 1a as in the Fresnel lens sheet 21" shown in FIG. 8. The lenticular lens 24 is provided at least on a specific part of the plane of emergence 1b of the base 1a, from which part the imaging light LS emerges in the direction inclined toward the projector 5 side.

As shown FIG. 8, in the Fresnel lens sheet 21" having the lenticular lens 24 on the plane of emergence 1b of the base 1a, the imaging light LS that has been refracted at the plane of refraction 3 of each prism 2 and then totally reflected at the plane of total reflection 4 of the prism 2 in the direction inclined toward the projector 5 side relative to the normal perpendicular to the sheet plane is partly reflected at the lenticular lens 24 on the plane of emergence 1b and returns to the incident side, where the lenticular lens 24 diffuses the light when it reflects the light. Therefore, when such a Fresnel lens sheet 21" is used together with a projection system comprising a mirror 6 as is shown in FIG. 9, and even if the light reflected from the plane of emergence 1b of the base 1a of the Fresnel lens sheet 21" toward the incident side is reflected at the mirror 6 in the projection system and returns again to the Fresnel lens sheet 21", the intensity of this reflected light is fully decreased, and lowering of image contrast can thus be effectively prevented as in the case of the Fresnel lens sheet 21 shown in FIG. 5.

It is enough for the Fresnel lens sheet 21 (21', 21") shown in FIG. 5, 7 or 8 to have the coating layer 22, the rough surface 23, or the lenticular lens 24 at least on a specific part of the plane of emergence 1b of the base 1a, from which part the imaging light LS emerges in the direction inclined toward the projector 5 side, and the coating layer 22, the rough surface 23, or the lenticular lens 24 may be provided on any part covering the above-described part (e.g., the entire part of the sheet plane).

(Process of Producing Fresnel Lens Sheet)

Next, a process of producing the Fresnel lens sheet 21 (21', 21") according to the aforementioned second embodiment will be described.

Firstly, to produce the Fresnel lens sheet 21 shown in FIG. 5, a Fresnel lens sheet that is the same as the Fresnel lens sheet 1 is obtained by the production process according to the above-described first embodiment, and a material having a low refractive index, such as a fluorocarbon or silicone resin, is applied to the plane of emergence 1b of the base 1a of this Fresnel lens sheet 1 by such a coating method as flow or dip coating to form a coating layer 22. The coating layer 22 may be formed on the plane of emergence 1b of the base 1a not by the above method but by vacuum deposition of multiple layers of inorganic materials such as $MgF_2$, $SiO_2$ and $TiO_2$ that are different in refractive index.

Further, in the case where an ultraviolet-curing resin method is employed as a process of producing the Fresnel lens sheet 21' or 22" shown in FIG. 7 or 8, a substrate having, on one surface, a rough surface 23 or lenticular lens 24 is laminated to an ultraviolet-curing resin applied to a mold. On the other hand, when a casting or hot-pressing method is used for producing the Fresnel lens sheet 21' or 22", a mold having a molding surface engraved with the shape of a rough surface 23 or lenticular lens 24 may be used.

(Rear Projection Screen Comprising Fresnel Lens Sheet)

The Fresnel lens sheet 21 (21', 21") shown in FIG. 5, 7 or 8 can constitute a rear projection screen by itself. Alternatively, as shown in FIG. 9, the Fresnel lens sheet 21 (21', 21") may constitute a rear projection screen 30 together with a lenticular lens sheet (light-diffusing sheet) 11 that is placed on the viewer's side of the Fresnel lens sheet 21 (21', 21").

In the case of the rear projection screen 30 shown in FIG. 9, a projector 5 is placed slantingly below the screen 30 at its rear, and by allowing a mirror 6 to reflect imaging light LS projected from this projector 5, the imaging light LS is projected on the rear projection screen 30 and is displayed to viewers.

In this case, owing to the above-described arrangement of the prisms 2, the rear projection screen 30 comprising the Fresnel lens sheet 21 (21', 21") does not produce stray light, or even if it produces stray light, the amount of stray light produced is small, so that the image projected on the rear projection screen 30 is entirely uniform in brightness and that the image is never degraded by such troubles as the production of double images, as in the case of the rear projection screen 10 according to the aforementioned first embodiment.

Moreover, in the rear projection screen 30 comprising the Fresnel lens sheet 21, since a coating layer 22 is formed on the plane of emergence 1b of the base 1a of the Fresnel lens sheet 21, the reflection of imaging light LS that occurs at the plane of emergence 1b of the base 1a is reduced, and an image with high contrast can thus be obtained. Similarly, in the rear projection screen 30 comprising the Fresnel lens sheet 21' or 21", since a rough surface 23 or lenticular lens 24 is provided on the plane of emergence 1b of the base 1a of the Fresnel lens sheet 21' or 21", the imaging light LS is scattered or diffused when it is reflected at the plane of emergence 1b of the base 1a, and an image with high contrast can thus be obtained.

Third Embodiment

Next, a Fresnel lens sheet according to the third embodiment of the present invention and a rear projection screen comprising it will be described with reference to FIGS. 10 and 11. The Fresnel lens sheet according to the third embodiment of the present invention is equivalent to the Fresnel lens sheet according to the aforementioned first embodiment to which additional prisms are further provided on its emergent-side surface (plane of emergence), and the other basic arrangement of this embodiment is almost the same as that of the first embodiment described above. In the first and third embodiments of the present invention, like reference numerals are used to designate like parts, and detailed descriptions for these parts are omitted.

(Arrangement of Fresnel Lens Sheet)

Figure 10:
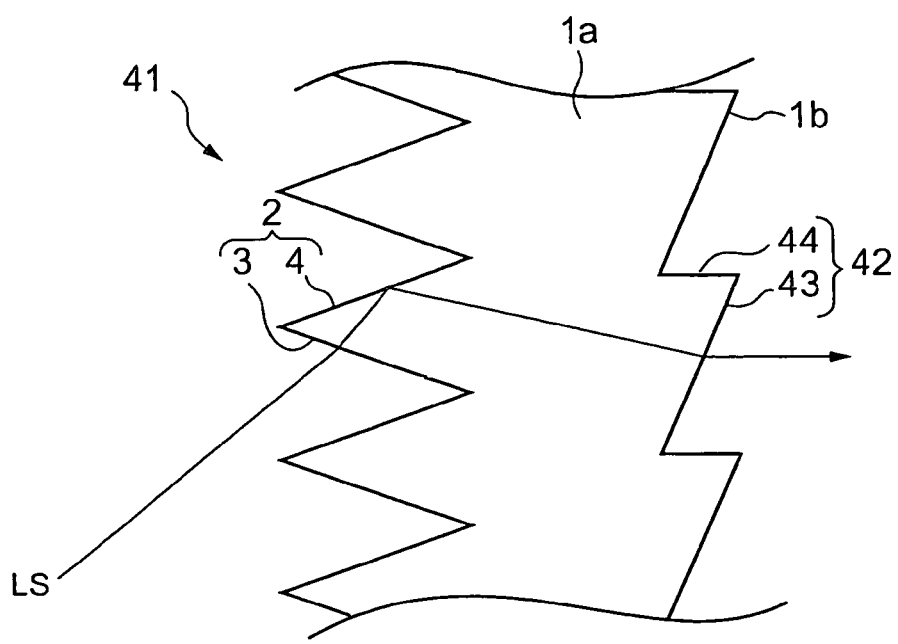
FIG. 10 is a sectional view, in the direction of thickness, showing a Fresnel lens sheet according to the third embodiment of the present invention.

As shown in FIG. 10, in a Fresnel lens sheet 41 according to the third embodiment of the invention, a plurality of additional prisms 42 are formed on the plane of emergence 1b of a base 1a whose incident-side surface is provided with prisms 2. The additional prisms 42 are formed concentrically around the point positioned at the same height as that at which the center P of the concentric circles of the prisms 2 exists. Moreover, the additional prisms 42 are formed at least on a specific part of the plane of emergence 1b of the base 1a, from which part imaging light LS emerges in the direction inclined toward the projector 5 side.

The additional prisms 42 are formed to have triangular cross-sections, and each additional prism 42 has a lens plane 43 by which the light that has been refracted at the plane of refraction 3 of each prism 2 on the incident side and then totally reflected at the plane of total reflection 4 of the prism 2 in the direction inclined toward the projector 5 side is allowed to emerge in the direction of the normal perpendicular to the sheet plane; and a non-lens plane 44 that connects two neighboring lens planes 43.

Thus, in the Fresnel lens sheet 41 shown in FIG. 10, a plurality of the additional prisms 42 are formed on the plane of emergence 1b of the base 1a, so that, of the imaging light LS that has passed through the prisms 2, the imaging light LS inclined toward the projector 5 side relative to the normal perpendicular to the sheet plane of the base 1a can be adjusted to emerge nearly vertically to the sheet plane of the base 1a.

As described above, in the Fresnel lens sheet 41 shown in FIG. 10, the additional prisms 42 and the base 1a are formed integrally. Alternatively, the additional prisms 42 may be formed on a prism sheet 45 that is prepared separately from the base 1a, as in the Fresnel lens sheet 46 shown in FIG. 11. Namely, a prism sheet 45 having, on its emergent-side surface, additional prisms 42 whose structure is the same as that of the additional prisms in the Fresnel lens sheet 41 shown in FIG. 10 is prepared, and is then adhered to the plane of emergence 1b of the base 1a with a transparent adhesive agent 47 or the like, thereby making the Fresnel lens sheet 46. Even in such a Fresnel lens sheet 46, of the imaging light LS that has passed through the prisms 2, the imaging light LS inclined toward the projector 5 side relative to the normal perpendicular to the sheet plane of the base 1a can be adjusted by the additional prisms 42 on the prism sheet 45 to emerge nearly vertically to the sheet plane of the base 1a.

Figure 11:
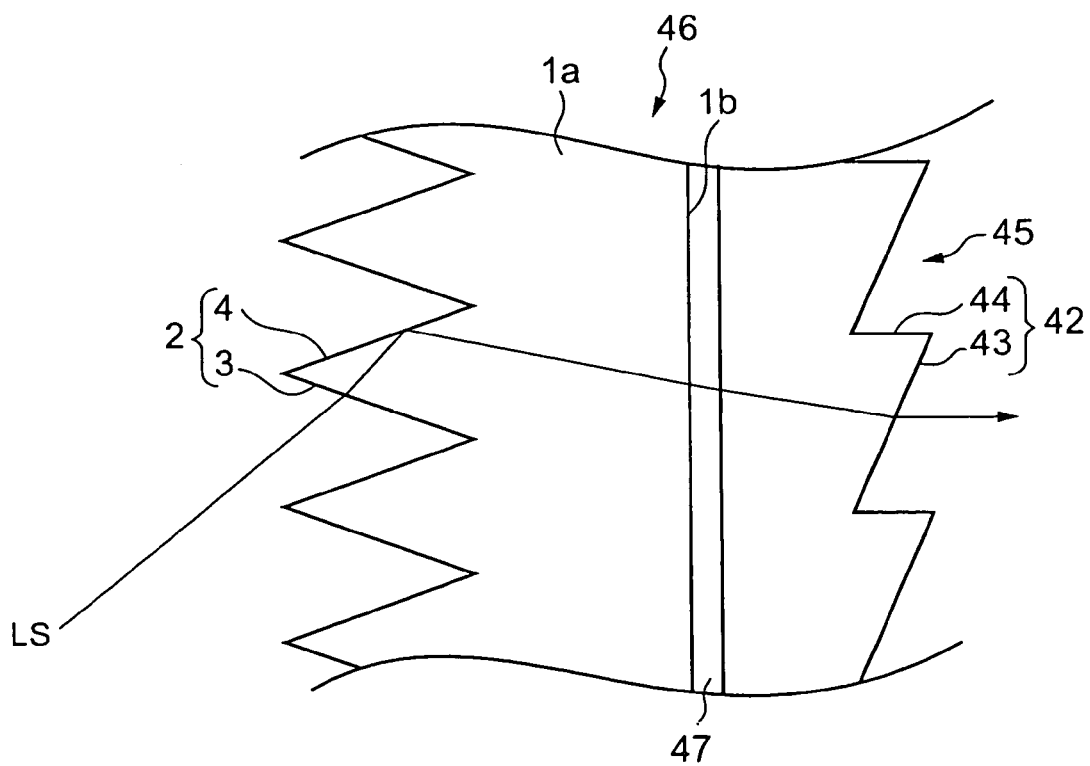
FIG. 11 is a sectional view, in the direction of thickness, showing a modification of the Fresnel lens sheet shown in FIG. 10.

Although the additional prisms 42 are, in the Fresnel lens sheet 46 shown in FIG. 11, formed on the emergent-side surface of the prism sheet 45, they may be formed not on the emergent-side surface but on the incident-side surface of the prism sheet 45. It is, however, preferable from the viewpoint of reduction of loss of light that the additional prisms 42 be formed on the emergent-side surface of the prism sheet 45, as shown in FIG. 11.

Further, although the additional prisms 42 are, in the Fresnel lens sheets 41 and 46 shown in FIGS. 10 and 11, formed concentrically around the point positioned at the same height as that at which the center P of the concentric circles of the prisms 2 exists, they may also be formed linearly (the edge of each prism extending in the horizontal direction) or concentrically on the sheet plane around the center of the sheet plane of the base 1a (the geometric center such as the center of gravity).

Furthermore, it is enough for the Fresnel lens sheet 45 or 46 shown in FIG. 10 or 11 to have the additional prisms 42 at least on a specific part of the plane of emergence 1b of the base 1a or of the emergent-side surface of the prism sheet 45, from which part the imaging light LS emerges in the direction inclined toward the projector 5 side. Therefore, the additional prisms 42 may be formed in any part covering the above-described part (e.g., the entire part of the sheet plane).

(Process of Producing Fresnel Lens Sheet)

Next, a process of producing the Fresnel lens sheets 41 and 46 according to the aforementioned third embodiment will be described.

Firstly, to produce the Fresnel lens sheet 41 shown in FIG. 10, a Fresnel lens sheet that is the same as the Fresnel lens sheet 1 is obtained by the production process according to the above-described first embodiment; a mold is laid, together with an ultraviolet-curing resin, on the emergent-side surface of this Fresnel lens sheet; and ultraviolet light is then applied to cure the ultraviolet-curing resin in the mold.

On the other hand, in producing the Fresnel lens sheet 46 shown in FIG. 11, a prism sheet 45 having additional prisms 42 on its emergent-side surface is prepared by the production process according to the first embodiment described above. Specifically, using a cutting tool or the like, a mold is firstly prepared by engraving a mold material with the shape corresponding to the incident-side surface of the prism sheet 45, and an ultraviolet-curing resin is applied to this mold. On this ultraviolet-curing resin applied to the mold, a substantially transparent substrate that transmits ultraviolet light is laid, and pressure is applied to the substrate by a pressure roller or the like, thereby bringing the substrate into close contact with the ultraviolet-curing resin. Thereafter, from above the substrate laminated in this manner, ultraviolet light is applied to cure the ultraviolet-curing resin. The ultraviolet-curing resin cured is then released from the mold and cut into the desired size, thereby obtaining the Fresnel lens sheet 45.

Thereafter, with a transparent adhesive agent 47 or the like, the prism sheet 45 produced in the above-described manner is adhered to the plane of emergence 1*b* of the base 1*a* of a Fresnel lens sheet, the same as the Fresnel lens sheet 1, produced by the production process according to the aforementioned first embodiment. Thus, there is obtained the Fresnel lens sheet 46.

(Rear Projection Screen Comprising Fresnel Lens Sheet)

The Fresnel lens sheet 41 or 46 shown in FIG. 10 or 11 can constitute a rear projection screen by itself. Alternatively, as in the above-described first and second embodiments, the Fresnel lens sheet 41 or 46 may constitute a rear projection screen together with a lenticular lens sheet (light-diffusing sheet) that is placed on the viewer's side of the Fresnel lens sheet 41 or 46.

In this case, owing to the above-described arrangement of the prisms 2, the rear projection screen comprising the Fresnel lens sheet 41 or 46 does not produce stray light, or even if it produces stray light, the amount of stray light produced is small, so that the image projected on the rear projection screen is entirely uniform in brightness and that the image is never degraded by such troubles as the production of double images, as in the cases of the rear projection screens 10 according to the first and second embodiments described above.

Moreover, in the rear projection screen comprising the Fresnel lens sheet 41 or 46, the additional prisms 42 are formed on the plane of emergence 1*b* of the base 1*a* or on the emergent-side surface of the prism sheet 45, so that, of the imaging light LS that has passed through the prisms 2, the imaging light LS inclined in the direction toward the projector 5 side relative to the normal perpendicular to the sheet plane of the base 1*a* emerges nearly vertically to the sheet plane of the base 1*a*. Therefore, the rear projection screen can display a bright image to viewers.

EXAMPLES

Example 1

A rear projection screen with a screen size of 50 inches (4:3) was assembled, as a rear projection screen of Example 1, from the Fresnel lens sheet and the lenticular lens sheet described under the following (1) and (2), respectively. A projector was placed at the center, in the horizontal direction, of the rear projection screen, but 312 mm below the lower edge of the rear projection screen and 400 mm distant from the rear projection screen in the direction normal to it, and imaging light was projected on the rear projection screen from this projector. The rear projection screen of Example 1 corresponds to the rear projection screen according to the first embodiment described above.

(1) Fresnel Lens Sheet

A Fresnel lens sheet having, on the plane of incidence of a base in sheet form, a plurality of prisms in the shape of circular arcs, each prism having a plane of refraction and a plane of total reflection, was prepared as a Fresnel lens sheet of Example 1. These prisms were formed on a polycarbonate substrate (refractive index 1.58) by applying thereto an ultraviolet-curing resin, followed by shaping. The prisms were concentrically formed around the point positioned at the center, in the horizontal direction, of the rear projection screen, but 312 mm below the lower edge of the rear projection screen. The pitch of the prisms was made 0.11 mm. Therefore, the radii of the prisms in the shape of circular arcs became between 312 mm and 1188 mm. Further, the prisms were formed to have an apical angle of 38°, and a material having a refractive index of 1.55 was used for forming the prisms. Regarding the angle of incidence at which the imaging light is projected on the rear projection screen, the angle at which the imaging light was incident on the prism with a radius of 312 mm, the minimum angle of incidence, was made 38°, while the angle at which the imaging light was incident on the prism with a radius of 1188 mm, the maximum angle of incidence, was made 71.4°.

Figure 12:
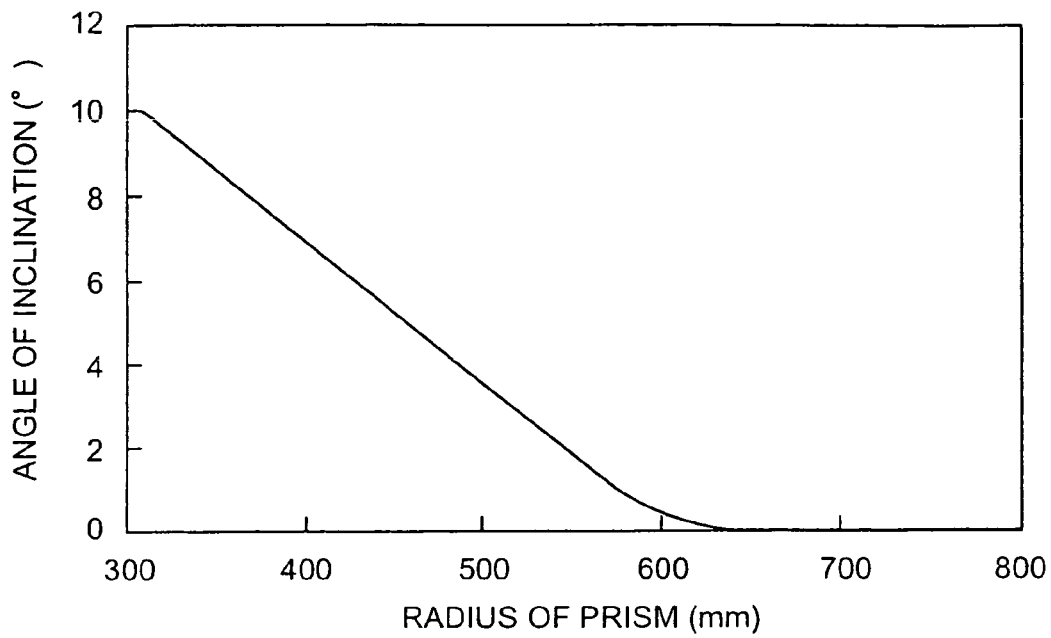
FIG. 12 is a diagram showing the relationship between the radius of the prism and the angle of inclination of the imaging light in the Fresnel lens sheets of Examples 1 to 3.
Figure 13:
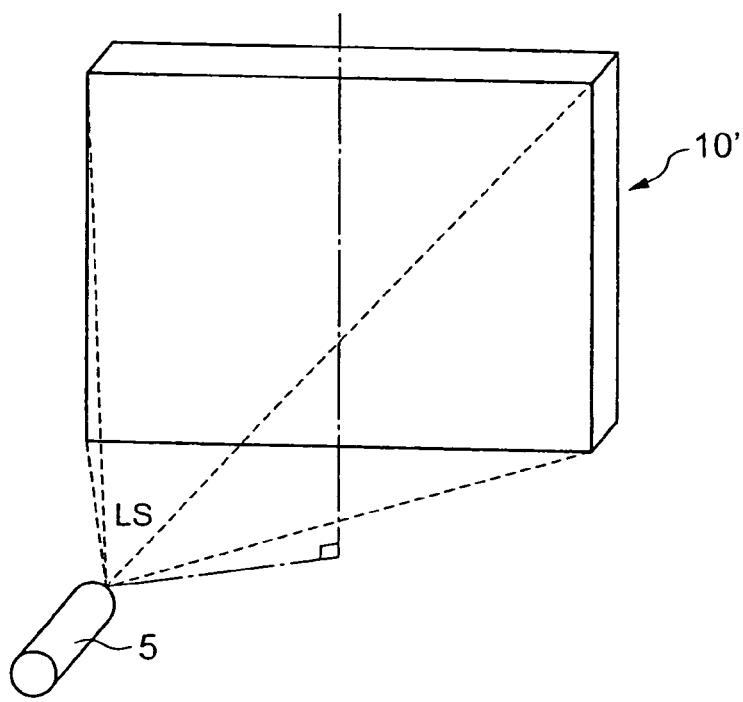
FIG. 13 is a view showing a conventional rear projection screen together with a projection system for the screen (a projection system that projects imaging light obliquely on the rear projection screen)
Figure 14:
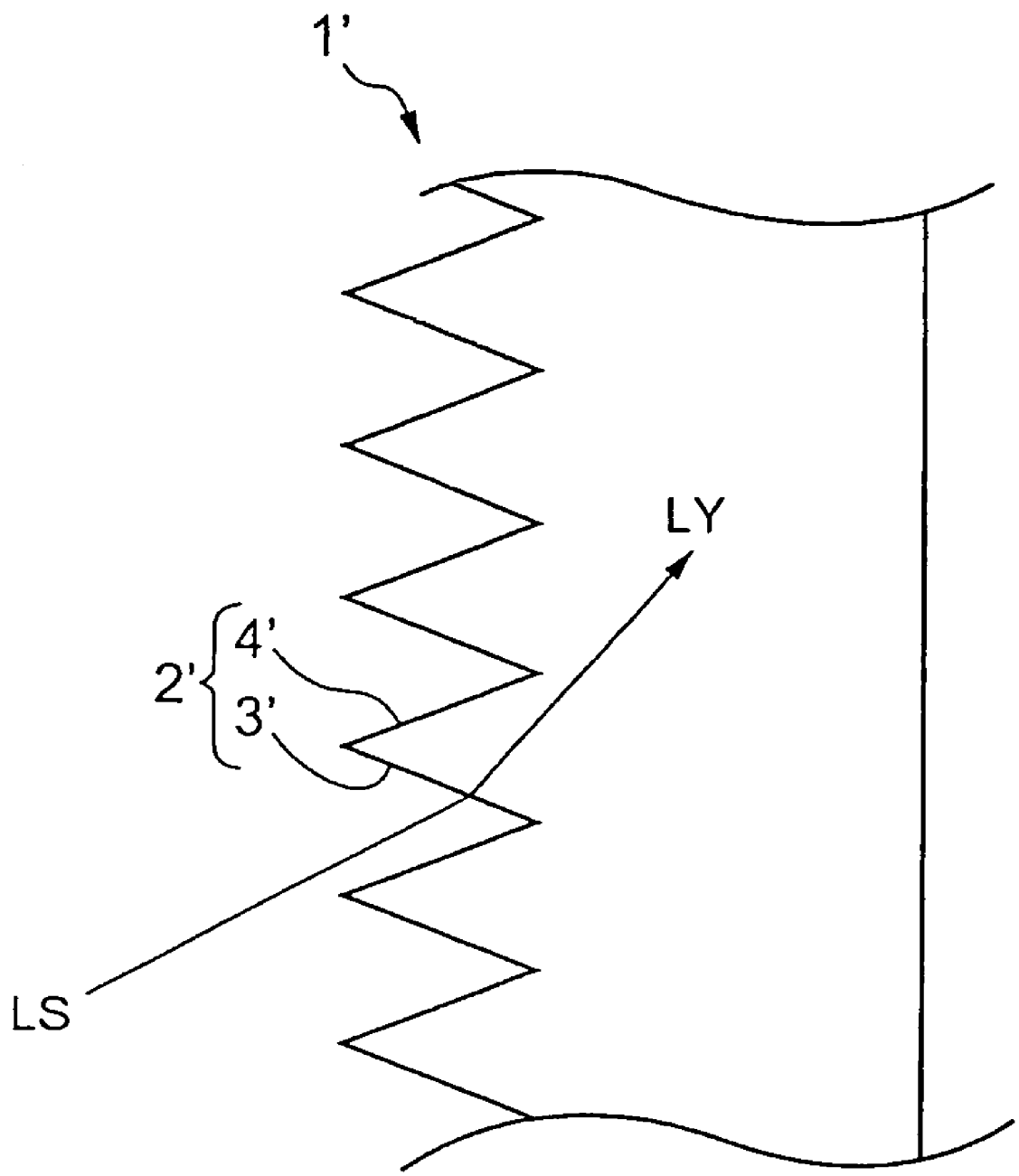
FIG. 14 is a sectional view, in the direction of thickness, showing a conventional Fresnel lens sheet.
Figure 15:
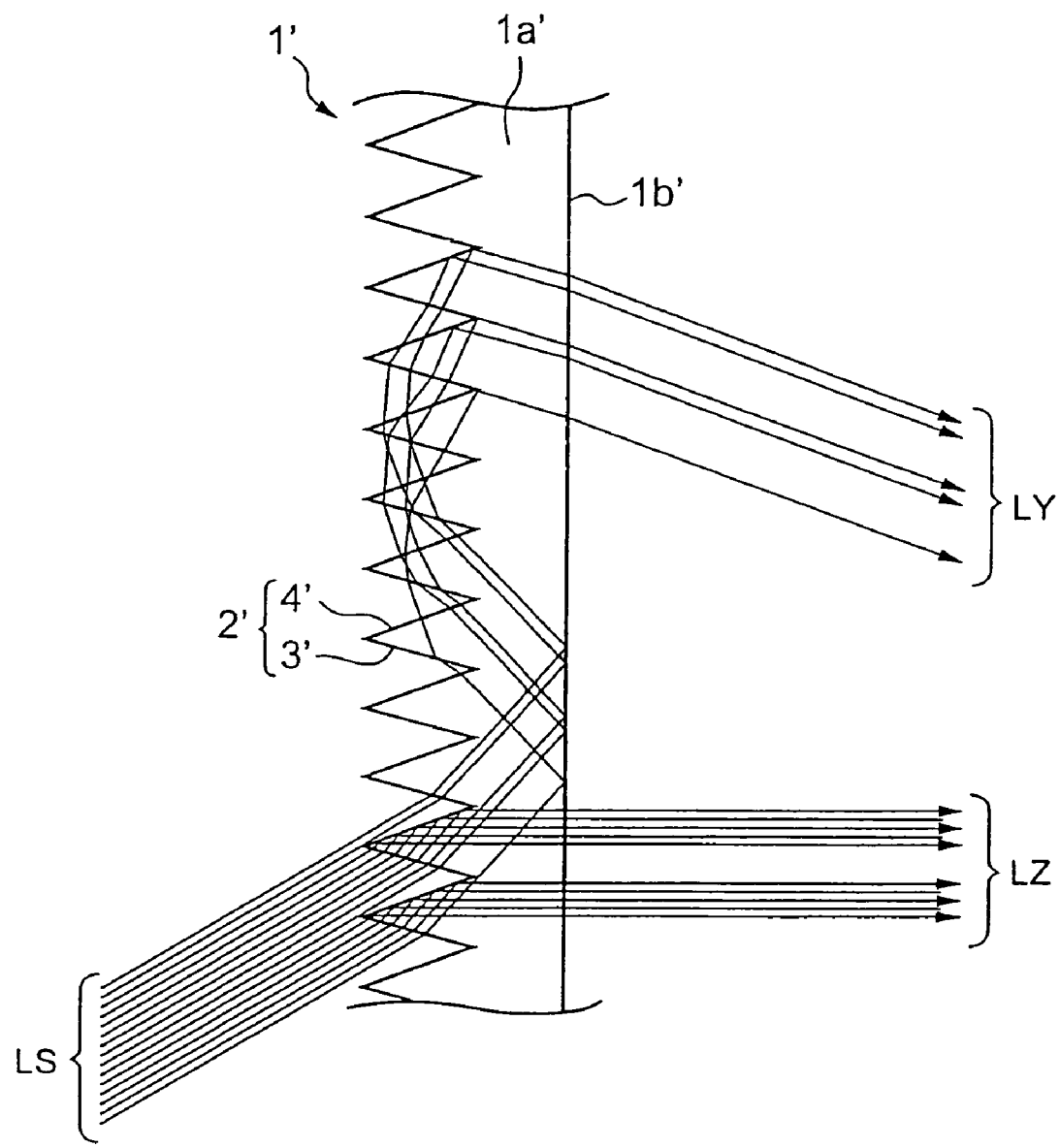
FIG. 15 is an illustration for explaining how a double image is produced due to stray light in a conventional Fresnel lens sheet.

The prisms were made so that the imaging light that had passed through the prism with a radius of 312 mm emerged in the direction inclined downward (toward the projector side) at an angle of 10° and that the angle of inclination (the angle between the direction in which the imaging light emerges and the normal perpendicular to the sheet plane) was gradually decreased to such an extent that the imaging light that had passed through the prism with a radius of 700 mm emerged vertically to the sheet plane (angle of inclination relative to the vertical direction: 0°). The prisms with radii of 700 to 1188 mm were made so that the imaging light that had passed through these prisms emerged vertically to the sheet plane (angle of inclination relative to the vertical direction: 0°). FIG. 12 is a diagram showing the relationship between the radius of the prism and the angle of inclination of the imaging light in Example 1.

(2) Lenticular Lens Sheet

A lenticular lens sheet that had linear lenses with half-elliptic cross-sections, extending in the vertical direction (direction of up and down) on the plane of incidence at a pitch of 0.14 mm, was prepared as a lenticular lens sheet of Example 1. The thickness of the lenticular lens sheet was made 1 mm, and a diffusing agent was dispersed in the lenticular lens sheet, thereby making the half angle of horizontal diffusion 30° and the half angle of vertical diffusion 12°. Further, a light-absorbing layer with a thickness of 20 μm was formed on the surfaces of the lenses with half-elliptic cross-sections. The absorbance of the light-absorbing layer was made 40%.

A rear projection screen was assembled from the above-described Fresnel lens sheet and lenticular lens sheet. Imaging light was projected on this rear projection screen from the above-described projector, and the image displayed on the rear projection screen was observed. As a result, no degradation caused by such troubles as the production of double images occurring due to stray light was found in the image, and the image was thus confirmed to be excellent.

Example 2

A rear projection screen with a screen size of 50 inches (4:3) was assembled, as a rear projection screen of Example 2, from the Fresnel lens sheet and the lenticular lens sheet described under the following (1) and (2), respectively. Directing to the side opposite to the incident side of the rear projection screen, a projector was placed at the center, in the horizontal direction, of the rear projection screen, but 312 mm below the lower edge of the rear projection screen and 100 mm distant from the rear projection screen in the direction normal to it, and a mirror was also placed at the center, in the horizontal direction, of the rear projection screen, but 200 mm below the lower edge of the rear projection screen and 250 mm distant from the rear projection screen in the direction normal to it, whereby the mirror was allowed to reflect, toward the rear projection screen, the imaging light projected from the projector. The rear projection screen of Example 2 corresponds to the rear projection screen according to the above-described second embodiment, comprising a coating layer on the emergent-side surface of the Fresnel lens sheet.

(1) Fresnel Lens Sheet

A Fresnel lens sheet having the same arrangement as that of the Fresnel lens sheet of Example 1 but comprising a coating layer formed on the emergent-side surface of the Fresnel lens sheet was used as a Fresnel lens sheet of Example 2. The coating layer was formed by laminating a 250 nm thick $TiO_2$ layer (refractive index 2.4) to the polycarbonate substrate (refractive index 1.58) constituting the Fresnel lens sheet and a 120 nm thick $SiO_2$ layer (refractive index 1.46) to this $TiO_2$ layer. The reflectance of the coating layer was made 1% (in the case of vertical incidence).

(2) Lenticular Lens Sheet

The same lenticular lens sheet as that of Example 1 was used as a lenticular lens sheet of Example 2.

A rear projection screen was assembled from the above-described Fresnel lens sheet and lenticular lens sheet. Imaging light was projected on this rear projection screen from the above-described projection system, and the image displayed on the rear projection screen was observed. As a result, neither degradation caused by such troubles as the production of double images occurring due to stray light nor lowering of contrast was found in the image, and the image was thus confirmed to be excellent.

Example 3

A rear projection screen with a screen size of 50 inches (4:3) was assembled, as a rear projection screen of Example 3, from the Fresnel lens sheet and the lenticular lens sheet described under the following (1) and (2), respectively. Directing to the side opposite to the incident side of the rear projection screen, a projector was placed at the center, in the horizontal direction, of the rear projection screen, but 312 mm below the lower edge of the rear projection screen and 100 mm distant from the rear projection screen in the direction normal to it, and a mirror was also placed at the center, in the horizontal direction, of the rear projection screen, but 200 mm below the lower edge of the rear projection screen and 250 mm distant from the rear projection screen in the direction normal to it, whereby the mirror was allowed to reflect, toward the rear projection screen, imaging light projected from the projector. The rear projection screen of Example 3 corresponds to the rear projection screen according to the above-described second embodiment, comprising a lenticular lens (light-diffusing element) on the emergent-side surface of the Fresnel lens sheet.

(1) Fresnel Lens Sheet

A Fresnel lens sheet having the same arrangement as that of the Fresnel lens sheet of Example 1 but comprising lenticular lenses extending in the horizontal direction, formed on the emergent-side surface of the Fresnel lens sheet, was used as a Fresnel lens sheet of Example 3. The lenticular lenses were formed to have half-circular cross-sections with a radius of 0.1 mm, and the pitch of the lenticular lenses was made 0.08 mm.

(2) Lenticular Lens Sheet

The same lenticular lens sheet as that of Example 1 was used as a lenticular lens sheet of Example 3.

A rear projection screen was assembled from the above-described Fresnel lens sheet and lenticular lens sheet. Imaging light was projected on this rear projection screen from the above-described projection system, and the image displayed on the rear projection screen was observed. As a result, neither degradation caused by such troubles as the production of double images occurring due to stray light nor lowering of contrast was found in the image, and the image was thus confirmed to be excellent.

The invention claimed is:

1. A Fresnel lens sheet useful for condensing imaging light obliquely projected from a projector to let the light emerge toward a viewer's side as nearly parallel rays, comprising:
    a base in sheet form; and
    a plurality of prisms formed on an incident side of the base, each of the prisms having a plane of refraction that refracts the imaging light projected and a plane of total reflection that totally reflects, toward the viewer's side, at least a part of the light refracted at this plane of refraction,
    wherein at least some of the plurality of prisms are so made that the imaging light that has been incident at an angle of not more than 40° and has passed through the Fresnel lens sheet emerges in a direction inclined toward a projector side at a predetermined angle of not more than 13° with respect to a normal perpendicular to a sheet plane of the base.

2. The Fresnel lens sheet according to claim 1, wherein the at least some of the plurality of prisms are those prisms that are situated in an area on which the imaging light projected from the projector is incident at a small angle to become stray light.

3. The Fresnel lens sheet according to claim 1, wherein the plurality of prisms are so made that the angle at which the imaging light that has passed through the prisms is inclined increases gradually as an angle at which the imaging light is incident on the prisms decreases.

4. The Fresnel lens sheet according to claim 1, further comprising, at least on a specific part of an emergent-side surface of the base, from which part the imaging light emerges in the direction inclined toward the projector side, a low-refraction layer made from a material whose refractive index is lower than that of a material for forming the base.

5. The Fresnel lens sheet according to claim 1, further comprising a light-diffusing element provided at least on a specific part of an emergent-side surface of the base, from which part the imaging light emerges in the direction inclined toward the projector side.

6. The Fresnel lens sheet according to claim 5, wherein the light-diffusing element is a rough surface provided on the emergent side of the base.

7. The Fresnel lens sheet according to claim 5, wherein the light-diffusing element is a lenticular lens provided on the emergent side of the base.

8. The Fresnel lens sheet according to claim 1, further comprising, on an emergent side of the base, a plurality of additional prisms by which, of the imaging light that has passed through the prisms, the imaging light inclined toward the projector side relative to the normal perpendicular to the sheet plane of the base is adjusted to emerge nearly vertically to the sheet plane of the base.

9. A rear projection screen comprising:
    a Fresnel lens sheet according to claim 1; and
    a light-diffusing sheet placed on the viewer's side of the Fresnel lens sheet.

* * * * *